3,201,245
METHOD OF PREPARING LIQUID INFANT FORMULA
Robert E. Clark and Elmer R. Eckhardt, Lansing, and Elbert R. Spence and Rexford C. Stribley, Mason, Mich., assignors to American Home Products Corporation, New York, N.Y., a corporation of Delaware
No Drawing. Filed Apr. 10, 1963, Ser. No. 271,871
1 Claim. (Cl. 99—57)

This invention relates to a method of treating a component of liquid infant feeding formulas. More particularly this invention relates to improvements in the pretreating of one of the essential and major components of such a product in a manner that imparts to the final product improved physical properties specifically stability to the heat of sterilization.

Considerable effort has been expended in recent years to produce a simulated human milk based on bovine or other sources of milk which would have all the chemical and physical characteristics as that of human milk. Due to the critical balance of the various components in human milk, it has been necessary to treat the components of a simulated human milk in a manner such that the various components on blending into the final product will result in a composition having the same nutritional value of human milk without any undesired characteristics such as for example those which would unduly burden critical body functions of an infant in the early stages of life.

The present invention is directed to such a substitute human milk formulation and may be characterized as one containing electrodialyzed whey as the major component together with lesser amounts of non-fat milk, lactose and a blend of edible fats. Trace quantities of vitamins and minerals may also be included.

Typical of compositions of this type are those described in U.S. 2,604,403. Therein a simulated human milk is prepared from a major quantity of electrodialyzed whey together with a casein source, lactose and a fat blend as well as necessary vitamins and minerals.

Experience has shown that while a generally satisfactory simulated milk formula can be prepared in small quantities such as laboratory quantities according to the teaching of the patent identified, in commercial production, when different whey sources are used to prepare the electrodialyzed whey in the manner required, considerable instability in the final product results. This instability takes the form of coagulation or graininess when the formula is subjected to high temperature "in-can" sterilization as is required to meet sanitary and health standards. Additionally the product has been found to possess an undesirable short shelf life stability. It has also been found that the final product will be lacking in certain physical qualities particularly in appearance with respect to color and in its odor characteristics. The foregoing, when found in a commercial product, quite obviously make such a product completely unsatisfactory for commercial use.

It is accordingly an object of the present invention to improve the method of preparing a substitute human milk formula utilizing milk base components.

It is further an object of the present invention to provide a method of treating an essential component of a substituted human milk formula in such a way that when compounded into infant feeding formula a most satisfactory product is obtained.

It is a still further object of the present invention to pretreat the cheese whey component of a simulated human milk formula prior to electrodialysis in a manner that on blending the electrodialyzed whey with other components of the liquid infant formula, a product is obtained which has greater shelf life stability and improved physical properties than has heretofore been consistently obtainable in commercial production of such a product.

These and other objects and advantages are now accomplished according to the method of the present invention which viewed in its broadest aspect is directed to the quite unexpected discovery that if during the preparation of the cheese whey prior to electrodialysis, the temperature is not permitted to exceed 165° F., the concentrated cheese whey, following electrodialysis as described hereafter, on being incorporated into an infant formula in the manner described results in a most satisfactory commercial product having chemical and physical properties substantially similar to those of human milk. Such a product has unexpected stability to high sterilization temperature and additionally has an odor and color most acceptable in a commercial product.

In the commercial manufacture of electrodialyzed whey in order to obtain an economically practical process, it is necessary to concentrate the whey before subjecting it to the electrodialysis treatment in order to reduce the volume of material to be dialyzed and to increase the efficiency of use of the dialyzing electricity by increasing the ionic concentration of the whey. It would be desirable to accomplish this concentration at high temperatures for two reasons. First, whey resulting from most cheese making contains a high level of the bacteria with which the milk is inoculated in the cheese process. An effective pasteurization of the whey to prevent further rapid growth and action of the bacteria is desirable. Secondly, whey is normally 93.5 to 94% water and the cost of removing this water is a major item in the manufacture of any dry whey product. The use of high temperatures in an evaporation process greatly increases its efficiency and reduces the cost of water removal. However, it has been found that such apparently desirable and widely used high temperature heat treatment cannot be used in the practice of the present invention for the reasons previously set forth.

It should be noted that in the prior art preparations of compositions of the type with which the present invention is concerned including those in which electrodialyzed whey was the major component no consideration had been given to the pretreating of the electrodialyzed whey.

In the preparation of the electrodialyzed whey component according to the improvement of the present invention, it has been found that as described in the 165° F. temperature limit is not exceeded during steps in which the cheese whey is prepared for electrodialysis, a product is obtained on the blending of the whey with the other components previously identified which has a stability not heretofore available. According to the practice of the present invention, the cheese whey will normally be concentrated as described more fully hereafter at a temperature in the range of 130° F. to the specified upper limit of 165° F.

It is essential to the production of a quality product that the upper limit not be exceeded during the pretreating or concentrating step. The examples which follow clearly demonstrate that if the whey is heated in excess of 165°

F. an instability or degradation of the infant formula occurs during the required sterilization following the final product blending. This instability takes the form of coagulation or a graininess in the product which makes the product unsuitable for commercial purposes. Considerable effort was directed to determining how this instability could be avoided since the electrodialyzed whey, the major component, must be processed to a mineral content of less than about 5 percent to provide a satisfactory product. From a chemical point of view, it was quite unexpected to discover that during the concentration step as required in the pretreatment of the cheese whey, control of the whey temperature below 165° F. produced a concentrated whey which could be readily electrodialyzed and more importantly thereafter combined with the components previously described to provide a product of improved stability to sterilization heat.

In carrying out pretreatment according to the method of the present invention, the cheese whey prior to electrodialysis is concentrated or evaporated to approximately 20 to 31 percent total solids. This concentration is accomplished in either single or multiple stage vacuum type evaporators or other suitable concentration equipment. Following evaporation under the conditions specified, the concentrated cheese whey is delivered to electrodialysis equipment and processed as described in U.S. 2,631,100 and U.S. 2,636,852.

Thereafter the electrodialyzed whey is blended with the other infant formula components described in greater detail in the example below. In the further processing the mixture after blending is stabilized by heating to a temperature of about 190° to 220° F. for a period of time of from about 4 minutes to not more than 15 minutes. Thereafter the mixture is cooled, introduced to cans, sealed and sterilized at a temperature of from about 240° F. to about 275° F.

Carrying out the concentration step under conditions of temperature in which an upper limit of 165° F. is not exceeded, results in a product which can be blended with the non-fat milk, lactose and fat without the adverse effects previously experienced. It will be noted in the data provided hereafter that when the preheat temperature of the cheese whey is permitted to exceed 165° F. that an unstable product results on sterilization of the final product as required.

EXAMPLE I

A quantity of sweet cheese whey was preheated to 167° F. in a high velocity tubular preheater held at 167° F. for about 5 seconds and evaporated to approximately 28 percent total solids in a double effect evaporator in which the maximum product temperature in the first effect was about 165° F. The concentrated whey was electrodialyzed in an electrodialysis stack equipped with ion-selective membranes to an ash content of one percent dry solids basis and spray dried under conditions which did not result in significant heat denaturation of the proteins. The electrodialyzed whey powder had a composition of 14 percent proteinous material, 81 percent lactose, 1.0 percent mineral salts and 3.5 percent moisture.

A quantity of this electrodialyzed whey powder was combined with 9 percent solids non-fat milk, edible grade lactose, a blend of oleo oil, coconut oil, corn oil, soy bean oil, and soy bean lecithin, vitamins, minerals and water to give preparation having about 24.1% total solids.

The mixture was then cooled to 45° F. and introduced into cans and heat sterilized at 265° F. An analysis of the product appears in Table I.

EXAMPLE II

A quantity of cheese whey is heated to a temperature of 155° F., and immediately flashed down to 140° F. by admitting the same to the first stage of a double effect evaporator. The sweet cheese whey is concentrated to approximately 28 percent total solids content and is passed to an electrodialysis apparatus and dried as in Example I. The electrodialyzed whey having an ash content less than 2 percent dry basis. The electrodialyzed whey (1 pound) is mixed with a non-fat milk (3.5 pounds) together with 0.25 pound of lactose and 0.5 pound of the fat blend of Example I above. The mixture is stirred and heated to a temperature of 165° F., homogenized at a pressure of 3000 p.s.i. and heat sterilized at a temperature of about 260° F. An analysis of the product is set forth in Table I.

EXAMPLE III

Another test was carried out according to this method of the previous example in which a triple effect evaporator was used at a temperature of 158° F. Final blend of the product was carried out in the amounts and conditions previously stated. The product was sterilized at a temperature of 240° F. The analysis of the characteristics of this product is shown in Table I.

EXAMPLE IV

Following the procedure of the previous example a whey was pretreated according to the method of the present invention in which this whey, prior to electrodialysis, was evaporated in a single stage evaporator at a temperature of 130° F. A product was prepared in the amount and manner stated in Example II and sterilized at a temperature of 250° F. The analysis of this product following sterilization is set forth in Table I.

Table I

| Whey Preheat Temperature | Viscosity of Sterilized Infant Formula | Visual Appearance of Infant Formula |
|---|---|---|
| Example I—167° F | Not measurable | Coagulated. |
| Example II—155° F | 6.0 cps | Smooth.[1] |
| Example III—158° F | 7.5 cps | Do.[1] |
| Example IV—130° F | 7.2 cps | Do.[1] |

[1] Smooth appearing upon draining from a spoon and also gives a smooth cloud-like appearance when dropped in clear cold tap water.

From the foregoing data, it will be immediately apparent that the improvement of the present invention which is directed to controlling the temperature of the cheese whey prior to and during concentration or evaporation in the manner specified results in a most satisfactory product even when sterilized at high temperature as is required. On the other hand, it will be noted that when this temperature exceeded 165° F. an unsatisfactory product results.

The reasons for this unexpected but highly desirable result are not clearly understood particularly in view of the fact that variations in the electrodialyzing of the whey following concentration do not seem to affect this result provided the whey product on electrodialysis, meets the normal specification of having not more than about 2 percent ash in the product.

While the improvement of the present invention has been described with some degree of particularity in the examples set forth herein, it is to be understood that the particular examples used were merely for purposes of illustration and are not to be considered as limiting on the scope of the invention. The invention is to be limited only by the claim appended hereto.

The invention claimed is:

In the process of producing a stable sterilizable liquid infant feeding composition containing electrodialyzed whey, as the major component, a source of casein, edible lactose and a mixture of edible fats, the improvement comprising the steps of sequentially:

(1) maintaining the temperature of the whey at between about 130° F. and not in excess of about 165° F. during evaporative concentration to a solid content of about 20 to about 31% prior to electrodialysis;
(2) electrodialyzing the concentrated whey by means of ion selective membranes until the ash content thereof is reduced to about 4%;
(3) blending the electrodialyzed whey with the said source of casein, edible lactose and the mixture of edible fats; and
(4) heat stabilizing the resulting composition at a temperature of about 190° F. to about 220° F. for a period of time of from about 4 to not more than 15 minutes, whereby the thus treated composition remains stable during sterilization at a temperature ranging from about 240° F. to about 270° F.

References Cited by the Examiner
UNITED STATES PATENTS

| | | | |
|---|---|---|---|
| 2,604,403 | 7/52 | Wiechers | 99—55 |
| 2,631,100 | 3/53 | Aten et al. | 99—57 |
| 2,695,235 | 11/54 | Goede | 99—57 |
| 2,780,548 | 2/57 | Stamberg | 99—57 X |
| 2,781,267 | 2/57 | Traisman et al. | 99—57 |
| 2,892,723 | 6/59 | Pech | 99—212 |

A. LOUIS MONACELL, *Primary Examiner.*